United States Patent [19]

Hathaway, Jr.

[11] 3,767,252

[45] Oct. 23, 1973

[54] CAMPER PICKUP TRUCK WITH REMOVABLE HARD TOP COVER

[76] Inventor: Milton R. Hathaway, Jr., 30 Parlee Rd., Chelmsford, Mass. 01824

[22] Filed: Sept. 21, 1971

[21] Appl. No.: 182,428

[52] U.S. Cl............................. 296/23 MC, 296/99
[51] Int. Cl................................................ B60p 3/32
[58] Field of Search................... 296/23 R, 23 MC, 296/99

[56] References Cited
UNITED STATES PATENTS
3,325,205  6/1967  Girski............................. 296/23 R Primary Examiner—Philip Goodman
Attorney—Robert E. Kleve

[57] ABSTRACT

The invention comprises a pickup truck and camper device. The pickup truck device has an open cab and the camper has a cab cover permanently mounted to the camper. When the camper is detachably mounted to the box of the pickup truck, the cab cover of the camper detachably covers the open cab of the truck. A replacement cab portion is provided to cover the open cab of the truck when the camper is detached.

3 Claims, 8 Drawing Figures

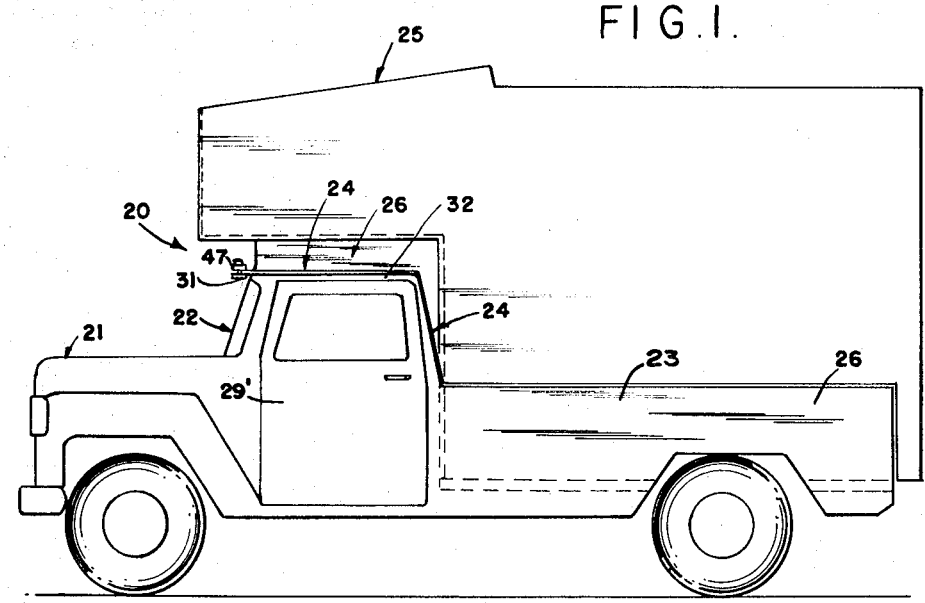

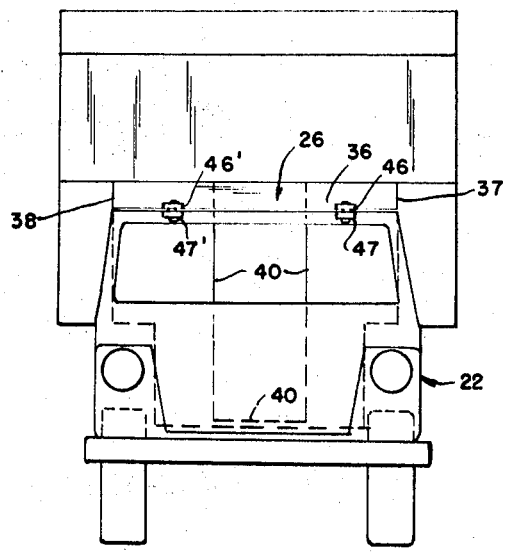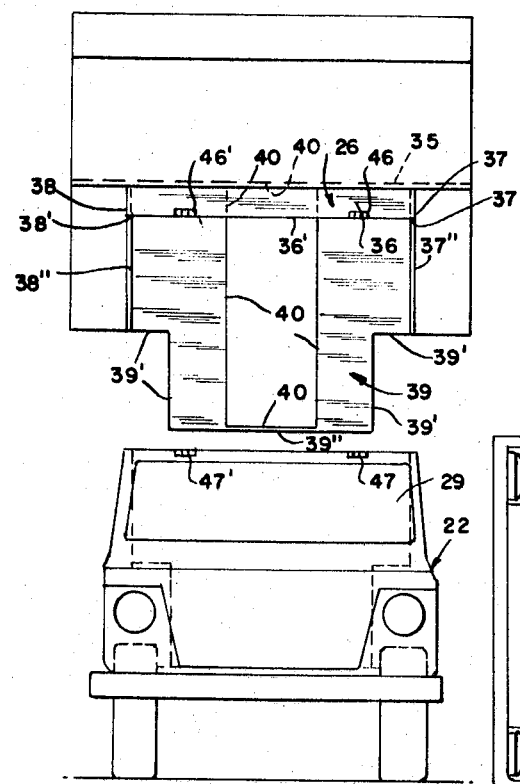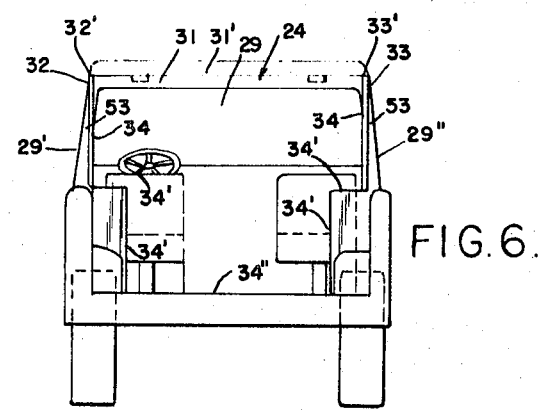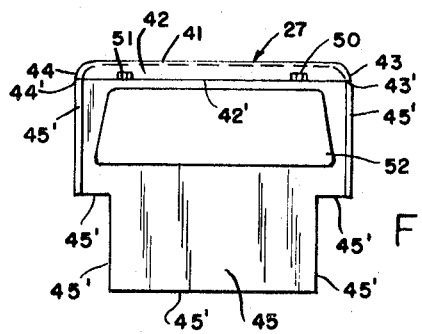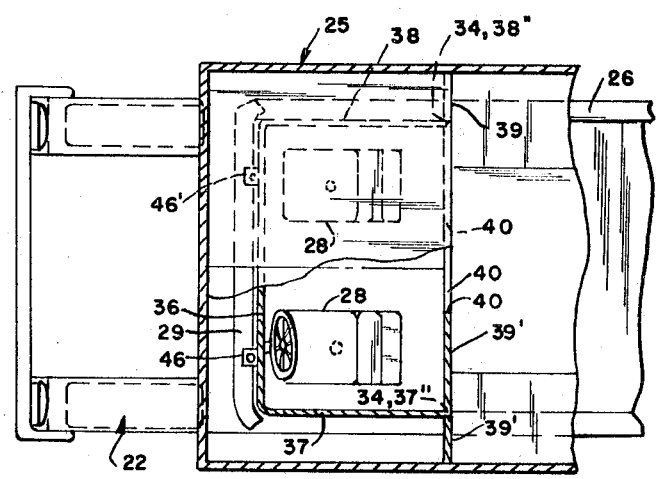

CAMPER PICKUP TRUCK WITH REMOVABLE HARD TOP COVER

This invention relates to campers, more particularly, the invention relates to a camper and a pickup truck cab passageway structure. This invention is also related to my co-pending patent application Ser. No. 53,971, filed July 10, 1970 entitled Pickup Truck and Trailer Passageway Device.

It is an object of the invention to provide a novel camper device having a pickup truck with an open cab portion and a camper with a hard top cab portion formed integrally with the camper and which covers the open cab of the truck and is separable therefrom, with the camper having a passageway therein, and with a removable hard top cab cover member being provided.

It is another object of this member to provide a novel camper device having a pickup truck with an open cab and a camper with a top cab portion forming a part oF the camper, and which top cab portion removably covers the open cab of the pickup truck. The camper also has a passageway to communicate into the cab of the pickup truck, and a replacement cab covering member is also provided.

It is a further object of the invention to provide a pickup truck having an open top and back cab portion and camper having a pickup truck top and back cab portion attached permanently to the camper. The open top and back portion of the pickup truck cab receives the top and back portion of the cab portion of the camper. A replacement cab top and back portion is also provided.

Further objects and advantages of the invention will become apparent as the description proceeds and when taken in conjunction with the accompanying drawing wherein:

FIG. 1 is a side elevational view of the pickup truck and camper invention Ilustrating the camper with its hard top and with the camper slidably mounted onto the box of the pickup truck with the hard top covering the cab of the truck.

FIG. 2 is a fragmentary side elevational view of the pickup truck, camper, and removable cab cover invention.

FIG. 3 is a fragmentary side elevational view of the pickup truck cab with the removable cab cover mounted to the cab of the pickup truck.

FIG. 4 is a front elevational view of the pickup truck and camper invention with the camper and its hard top attached to the cab and box of the truck.

FIG. 5 is a front elevational view of the pickup truck and camper invention with the camper and its hard top detached from the cab and box of the truck and revealing the passageway in the front of the camper wall.

FIG. 6 is a rear elevational view of the pickup truck revealing the open back and top of the cab of the truck.

FIG. 7 is a front elevational view of the removable cab cover.

FIG. 8 is a cross-sectional view taken along line 8—8 of FIG. 1.

Briefly stated, the invention comprises a novel camper device having a pickup truck with an open cab portion and a camper with a hard top cab portion formed integrally with the camper and which covers the open cab of the truck and is separable therefrom. The back wall of the cab portion of the camper also serves as the front wall of the cab and has a passageway therethrough to provide communication between the cab and camper. A detachable hard top cover is also provided to cover the open cab of the truck when the camper is detached.

Referring more particularly to the drawings in FIGS. 1, 2, and 3 the molded hard top cab invention 20 is illustrated having a conventional pickup truck 21. The pickup truck 21 has a cab 22 and a box 23 at the rearward end. The cab 22 has an opening 24 in the cab along the top and back portion of the cab. A box like camper 25 is slidably mounted into the box 23 of the pickup truck. The box like camper has a hard top cab cover member 26 which is permanently fixed to the forward portion of the camper and which covers an opening 24 in the top and back of the cab of the pickup truck, which opening extends along line 24, as shown in FIG. 1. The hard top cab invention 20 also includes a detachable molded hard top cover member 27 as illustrated in FIG. 2.

PICKUP TRUCK

The cab 22 of the pickup truck 20, at the front of the truck has conventional side portions and front portions with a pair of seats 28 and 28' therein for the driver and a passenger, respectively, to sit upon. The cab or closure 22 has a front window 29 and a pair of side doors 29' and 29''. The opening 24 in the cab or closure 22 extends along the top and along the back of the cab 22. The cab 22 includes a cab wall or sheet metal upper front edge portion 31 which extends along the front window 29 and portion 32 which extends along the door 29' and wall portion 33 which extends along the door 29''. The wall portion 31 terminates with an upper front edge 31' along the top of the front window 29 and the wall portion 32 terminates with upper side edge 32' along the top of the side door 29' and the wall portion 33 terminating with an upper side edge 33'. The cab wall 22 also has rearward wall portions which terminate with rearward edges 34 and 34' along the rearward portion of the cab wall. The cab wall also has a bottom edge portion 34'' which is substantially flush with the floor 35 of the box 23 to thereby define the opening in the back portion 30' of the opening 22 in the cab wall 31.

Thus, the area of the cab opening 24 along the top of the cab of the pickup truck is defined by the edge portions 31', 32', 33', 34' and 34''.

CAMPER WITH HARD TOP MEMBER

The hard top cover 26 of the camper 25 is molded or otherwise permanently fixed to the under side surface panel 35 of the camper.

The hard top cover portion 26 of the camper 25 has a top front wall portion 36 extending downwardly from the under surface panel 35 with a front edge 36'. A pair of downwardly extending side flanges 37 and 38 which extend downward from the under surface panel 35 and terminate in the side edges 37' and 38' and 37'' and 38'', and which wall portions are formed integrally with one another and with the under surface panel 35.

The hard top member 26 of the camper also has rear wall portion 39 extending downward from the rear of the under surface panel 35 and also serves as a front wall for the camper and which terminates in outer edges 39'.

The outer edges 31', 32', and 33' of the cab mate with the outer edges 36', 37', and 38' and the rear side edges 34 of the cab mate with the side edges 37" and 38" of the camper, and the edges 34' and 34" mate with the edges 39' and 39" of the camper, respectively, of the cab of the pickup truck to close the top and back opening in the cab of the truck, when the camper is detachably mounted into the box of the truck as illustrated in FIGS. 1 & 4.

The rear wall member 39 has a rectangular opening 40 therein which serves as a passageway between the camper and cab of the pickup truck.

The under surface panel 35 may also be cut out forward toward the front of the camper to provide more headroom when entering the cab from the camper.

To attach the camper 25 to the pickup truck, the camper will be slid from left to right when viewed from FIG. 1, into the box 25 of the truck, with the main body of the camper 24 sliding into the box 23 until it reaches its position shown in FIG. 1, and with cab cover member 26 sliding over the opening 24 in the cab of the truck until it reaches its position shown in solid lines in FIG. 1 to effectively close the cab opening 24. A pair of flanges 46 and 46' may extend outward from the front of the front flange 36 of the cab portion and a pair of flanges 47 and 47' extend outward from the front 36 of the cab of the truck, and suitable latching means such as bolts 49 pass through bores in the lugs or flanges 46, 46', 47, and 47' to lock the cab portion of the camper to the cab of the truck.

REMOVABLE HARD TOP COVER MEMBER

The removable hard top cover member 27 having a top wall portion 41, and front flange portion 42, and side flange portions 43 and 44 which extend downwardly from the top wall portion 41 and are formed integrally therewith. The removable hard top member 27 also has a rear wall portion or member 45 which extends downwardly from the top wall portion 41 and its upper portions are formed integrally with the front wall portion 42, and side flanges 43 and 44. The rear wall 45 has a window 52. The outer edges 42', 43', & 44', of the hard top member mate with the edges 31', 32', and 33', respectively, and the rear edges 45" mate with the edges 34, 34', and 34" of the cab opening 22 to close the cab of the pickup truck, as illustrated in FIG. 3.

The removable hard top member 27 has a silhouette which generally corresponds with the silhouette of the cab 22 of the truck so as to provide relatively smooth uninterrupted surface when the hard top member 27 is attached.

Similarly, the hard top cover member has a shell like conduction with a pair of flanges 50 and 51 which extend from its forward end and which align in flush relationship onto the flanges 47 and 47' when the hard top cover has been attached, so that bolts may extend through bores in the flanges 50 and 51 of the cab of the truck and through bores in the flanges 47 and 47' of the hard top cover 27.

Also a folding fabric convertable type cover may be employed in lieu of the hard top cover to close the opening in the cab of the pickup truck, when the camper is not being used, and is detached from the pickup truck.

The seats 28 and 28' of the pickup truck may be of a swivel type having a central pole support for rotatably mounting the seats to the floor of the cab of the truck.

Thus, it will be seen that a novel pickup truck and camper device has been provided whereby the camper has a cab portion covering and open portion in the cab of the pickup truck, so that the space therebetween may be employed more effectively for living space, and a cover member is provided to close the open cab of the truck when the camper is detached, so that the truck may be used, with a closed cab for other purposes when the camper is detached.

The vertical edges 37" and 38" of the cover member 26 of the camper and the upper pair of vertical edges 45' of the hard top cover member 27 are tapered inwardly and the pair of opposing edges 34 of the pickup truck may be tapered outwardly in the opposite direction, for easier mating of the edges together when the camper or the hard top cover member are attached to the cab of the truck. Also, the other rearward edges which mate together may be similarly tapered for easier attachment.

The side frame portions 32 and 33 of the cab 22 which extend across the top of the doors 29' and 29" and the upper rear frame portions 53 along the upper rear edges of the door frame of the cab 22 may also be included as a part of the hard top cover member 27, and as a part of the hard top cover portion 26 of the camper 25. When these portions are included, the line of separation 24 between the cab and the hardtop cover member 27 and between the cab and the hardtop cover member 26 of the camper will extend from the edges 31' of the frame member downward at the front corners of the cab to the top edges 54 of the doors 29' and 29" and back along the top edges 54 rearward and then downward along the rear edges 54' of the doors 29' and 29" to a point just below the door handles and then inwardly along the same horizontal plane as the horizontal edge 34' and the horizontal edge 45' until it reaches the horizontal edges 34' and 45'.

Also, in addition to including the frame portions 32 and 33 along the top of the door frames and the upper rear frames portions 53 along the back of the door frames, the hardtop member 27 and the hardtop cover member 26 may also include the top 55 and upper back portion 55' of the door frame, so that the door windows when closed will have their upper edges and rear edges resting in grooves in the hardtop member 27 or grooves in the hardtop cover portion 26 of the camper depending upon which is attached to the cab of the truck.

It will be obvious that various changes and departures may be made to the invention without departing from the spirit thereof, and accordingly, it is not intended that the invention be limited to that specifically described in the specification or as illustrated in the drawing, but only as set forth in the appended claims wherein:

What is claimed is:

1. A camper device comprising a pick up truck having front and rear wheels, said truck having a box at the rear end with a floor and side panels, said truck having a passenger compartment spaced forward from the rear end of the truck in front of said box, said passenger compartment having a front windshield with side doors and a top and back wall portion to form a four sided compartment with the back wall portion projecting down between the forward ends of the side panels of the box of the truck, said top and back wall portion being integrally connected together with a window in the back wall portion, said top and back wall portion being detachable from said compartment as a single unit to provide an open top and back to said compartment, a camper having a box like configuration with a front wall and an overhange overhanging the front wall, said camper being attachable to said pick up truck in place of said top and back wall portion with the front wall adapted to fit into the back of said compartment and with the overhange adapted to fit over the top of said compartment.

2. A camper device according to claim 1 wherein said rear wall of said top and back wall member is adjacent the central portion of said pick up truck when said top and back wall portion is attached to said pick up truck.

3. A camper device comprising a pick up truck having front and rear wheels, said truck having a box at the rear end with a floor and side panels, said truck having a passenger compartment spaced forward from the rear end of the truck in front of said box, said passenger compartment having a front windshield with side doors and a top and back wall portion to form a four sided compartment with the back wall portion of the compartment projecting down between the forward ends of the side panels of the box of the truck, said top portion and at least a major portion of the back wall portion being integrally connected together with a window in the major portion of the back wall portion, said top and major back wall portion being detachable from said compartment, with minor portions of said back wall portion being fixed to the remainder of said compartment, whereby said top and major back wall portion may be detached to provide and open top and back to said compartment, said major portion of said back wall portion being adjacent the central portion of the truck when said top and major back wall portion are attached to said compartment of said truck.

\* \* \* \* \*